United States Patent [19]
Liao

[11] Patent Number: 6,135,254
[45] Date of Patent: Oct. 24, 2000

[54] ELECTRIC WIRE REEL

[76] Inventor: Sheng Hsin Liao, No. 10, Alley 38, Lane 229, San Jen Street, Shu-Lin Chen, Taipei Hsien, Taiwan

[21] Appl. No.: 09/207,985

[22] Filed: Dec. 9, 1998

[51] Int. Cl.[7] .................................................. H02G 11/00
[52] U.S. Cl. .................................... 191/12.4; 191/12.2 R
[58] Field of Search ............................ 191/12 R, 12.2 R, 191/12.4, 12.2 A

[56] References Cited

U.S. PATENT DOCUMENTS

| | | | |
|---|---|---|---|
| 4,201,278 | 5/1980 | Balde ..................................... | 191/12.4 |
| 4,940,859 | 7/1990 | Peterson ................................. | 191/12.4 |
| 5,299,670 | 4/1994 | Willard ............................... | 191/12.2 R |
| 5,819,893 | 10/1998 | Wagner et al. ......................... | 191/12.4 |
| 6,059,081 | 5/2000 | Patterson et al. .................. | 191/12.2 R |

*Primary Examiner*—Mark T. Le

*Attorney, Agent, or Firm*—Rosenberg, Klein & Lee

[57] ABSTRACT

An electric wire reel includes a bottom cover shell, a top cover shell covered on the bottom cover shell, a rotary mount rotatably mounted on an annular coupling flange inside the top cover shell and holding a plurality of L-shaped terminals, a terminal holder fixedly mounted in the bottom cover shell and holding a plurality of annular terminals of different diameters, a rotary disk fixedly coupled to the rotary mount, metal conductive means mounted in the rotary disk and electrically connecting the L-shaped terminals to the annular terminals, a first electric wire wound round the rotary mount with conductors therein respectively connected to the L-shaped terminals, a second electric wire extended out of a wire outlet on the bottom cover shell with conductors therein respectively connected to the annular terminals, and a spiral power spring mounted in the bottom cover shell and coupled to the rotary disk outside the rotary mount to return the rotary disk and the rotary mount after the first electric wire being pulled out of the top cover shell.

3 Claims, 11 Drawing Sheets

ELECTRIC WIRE REEL

BACKGROUND OF THE INVENTION

The present invention relates to an electric wire reel, and more particularly to such an electric wire reel designed for use in telecommunication engineering.

Regular electric wire reels commonly use a winding mechanism to automatically take up an electric wire. Because this kind of winding mechanism occupies much installation space, the housing must have sufficient space to hold the winding mechanism. Furthermore, because the winding mechanism and the electric wire are coaxially arranged inside the housing, the pulling force which is received by the winding mechanism is relatively increased when the electric wire is pulled out of the housing farther.

SUMMARY OF THE INVENTION

It is one object of the present invention to provide an electric wire reel which is compact and handy. It is another object of the present invention to provide an electric wire reel which is durable in use. According to the present invention, the electric wire reel comprises a bottom cover shell, a top cover shell covered on the bottom cover shell, a rotary mount rotatably mounted on an annular coupling flange inside the top cover shell and holding a plurality of L-shaped terminals, a terminal holder fixedly mounted in the bottom cover shell and holding a plurality of annular terminals of different diameters, a rotary disk fixedly coupled to the rotary mount, metal conductive means mounted in the rotary disk and electrically connecting the L-shaped terminals to the annular terminals, a first electric wire wound round the rotary mount with conductors therein respectively connected to the L-shaped terminals, a second electric wire extended out of a wire outlet on the bottom cover shell with conductors therein respectively connected to the annular terminals, and a spiral power spring mounted in the bottom cover shell and coupled to the rotary disk outside the rotary mount to return the rotary disk and the rotary mount after the first electric wire being pulled out of the top cover shell. Because the spiral power spring and the rotary mount (the first electric wire) are not concentrically arranged inside the cover shells, the spiral power spring receives a constant pulling force when the first electric wire is pulled out of the top cover shell.

DETAILED DESCRIPTION OF THE PREFERRED EMBODIMENT

Figure 1:
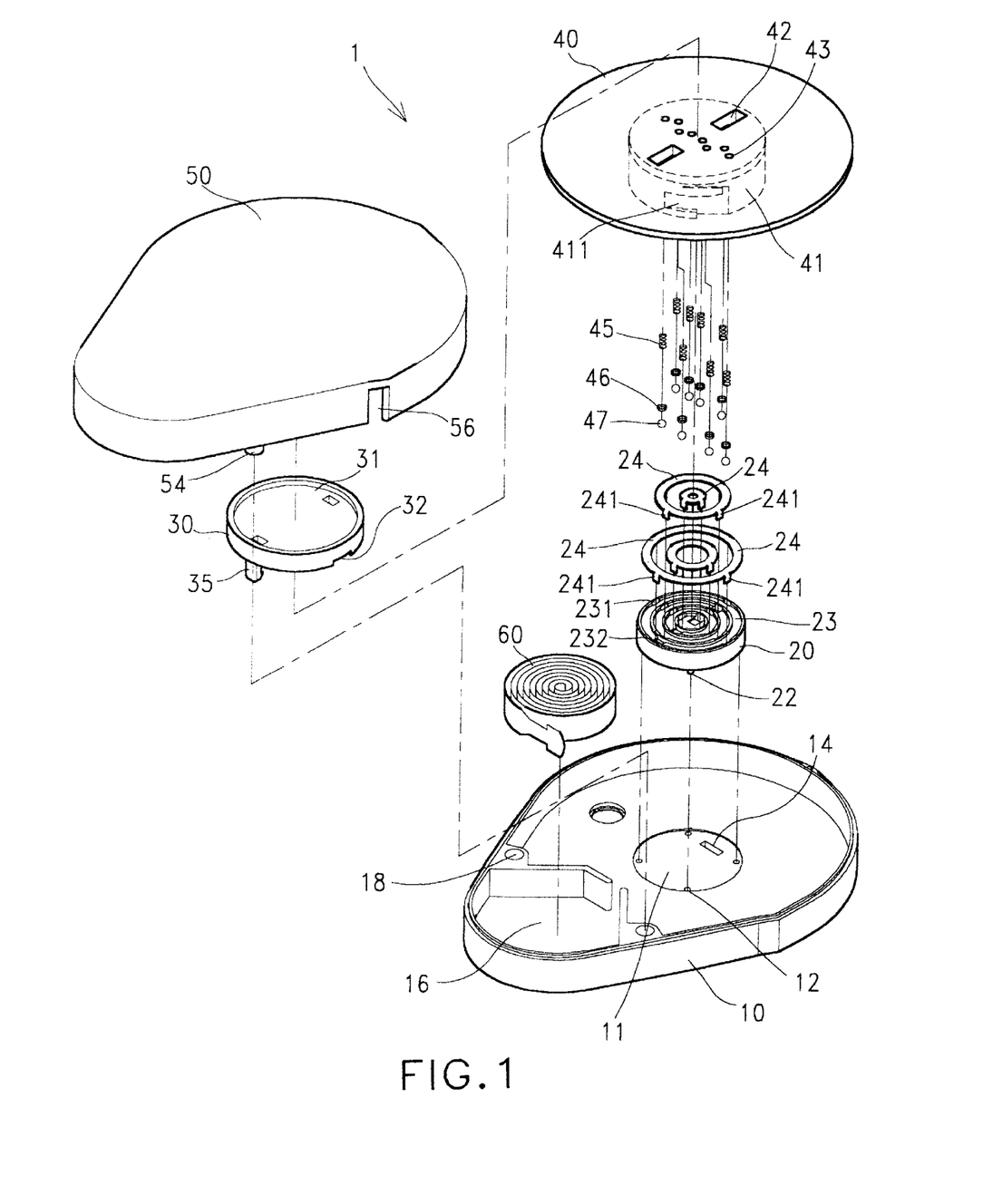
FIG. 1 is an exploded view of an electric wire reel according to the present invention (the electric wires excluded).
Figure 2:
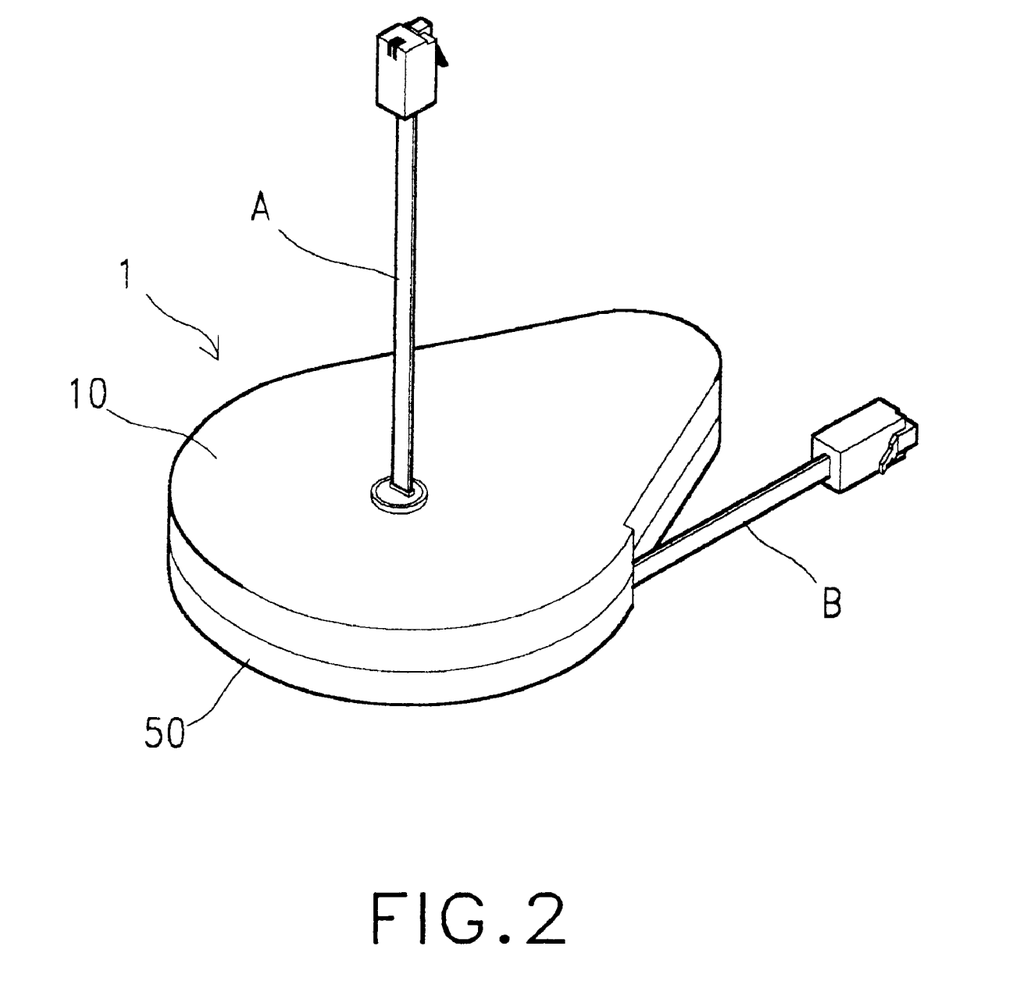
FIG. 2 is an elevational view of the electric wire reel according to the present invention.

Referring to FIGS. 1 and 2, an electric wire reel in accordance with the present invention is generally comprised of a top cover shell 50, a bottom cover shell 10, a rotary mount 30, a rotary disk 40, a spiral power spring 60, and a terminal holder 20. The bottom cover shell 10 comprises a circular recess 11 at the center, a plurality of locating holes 12 and a wire outlet 14 through the circular recess 11, a spring chamber 16, which receives the spiral power spring 60, and a plurality of mounting holes 18 at the border area.

Figure 3:
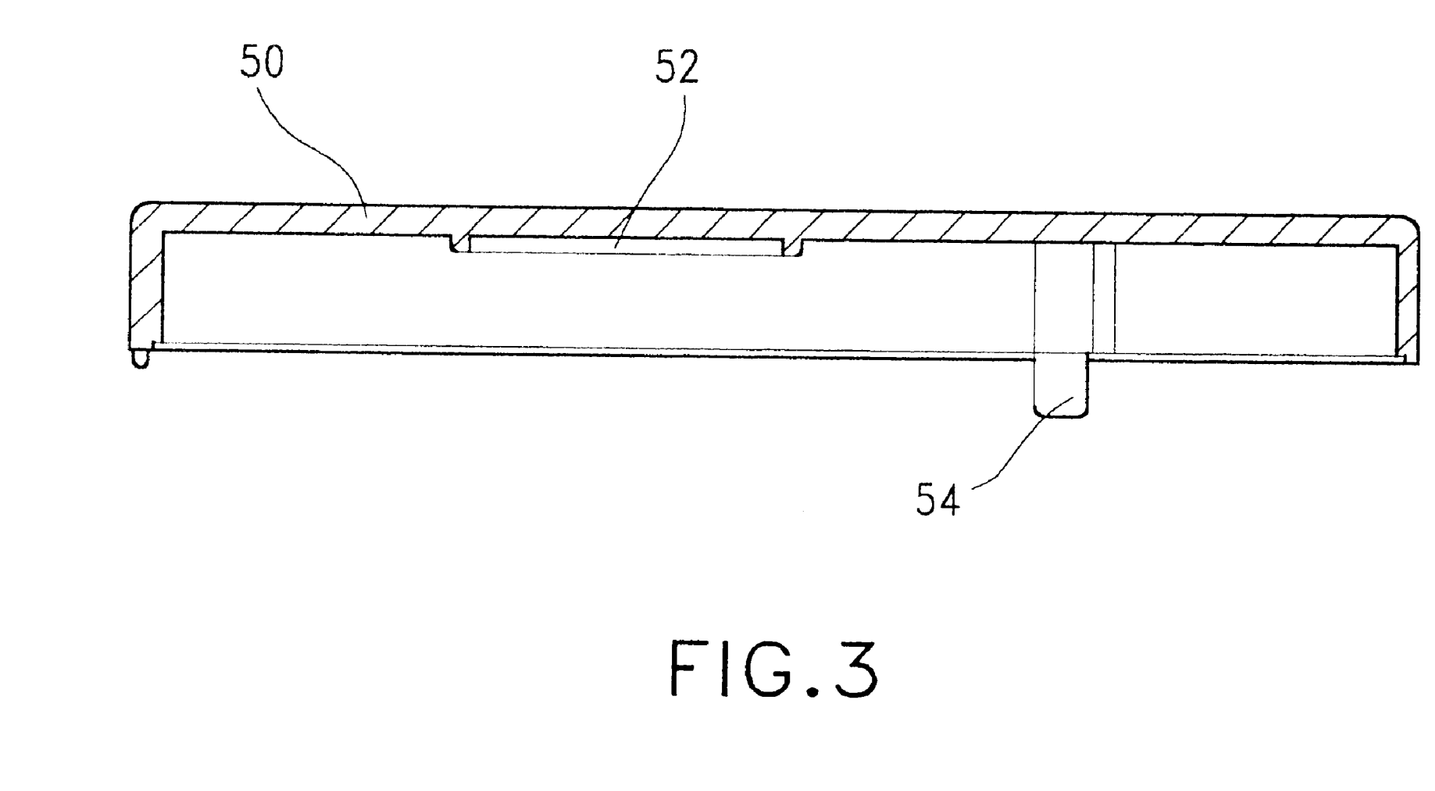
FIG. 3 is a sectional side view of the top cover shell for the electric wire reel, according to the present invention.
Figure 4:
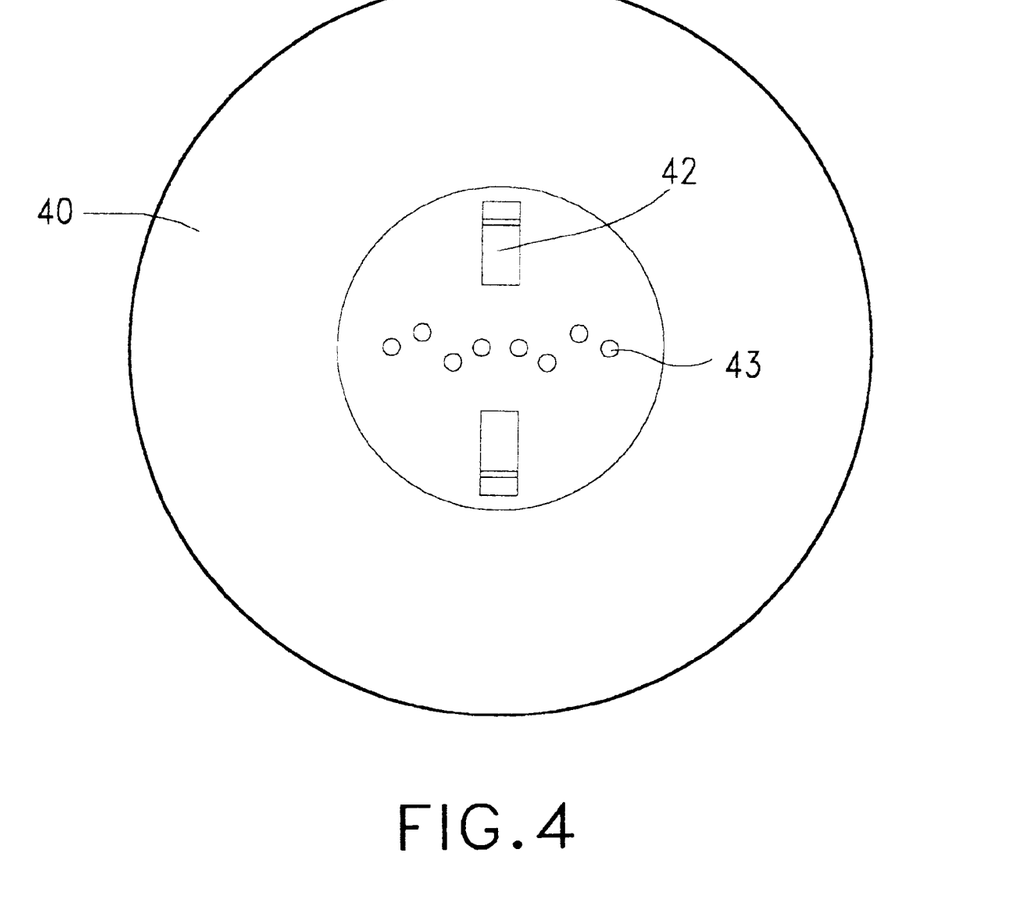
FIG. 4 is a top plain view of the rotary disk for the electric wire reel according to the present invention.
Figure 5:
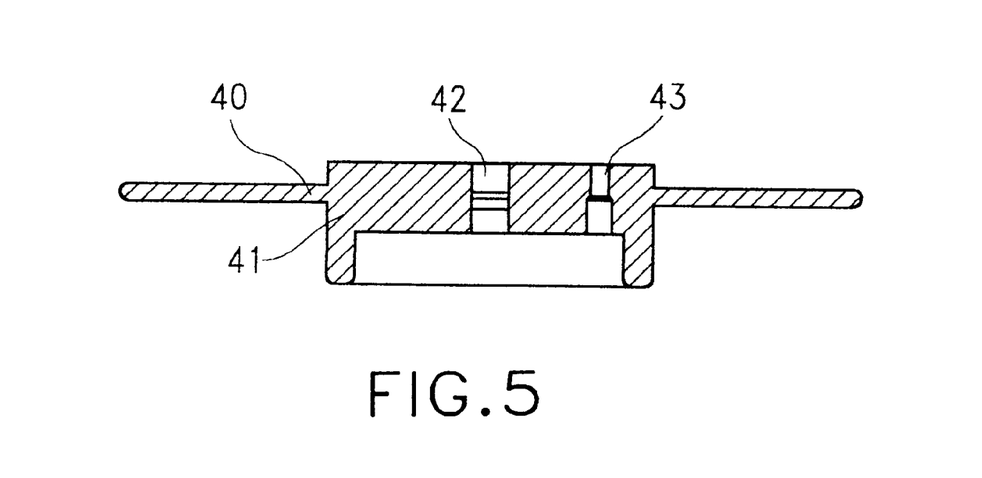
FIG. 5 is a sectional side view of the rotary disk for the electric wire reel according to the present invention.
Figure 6:
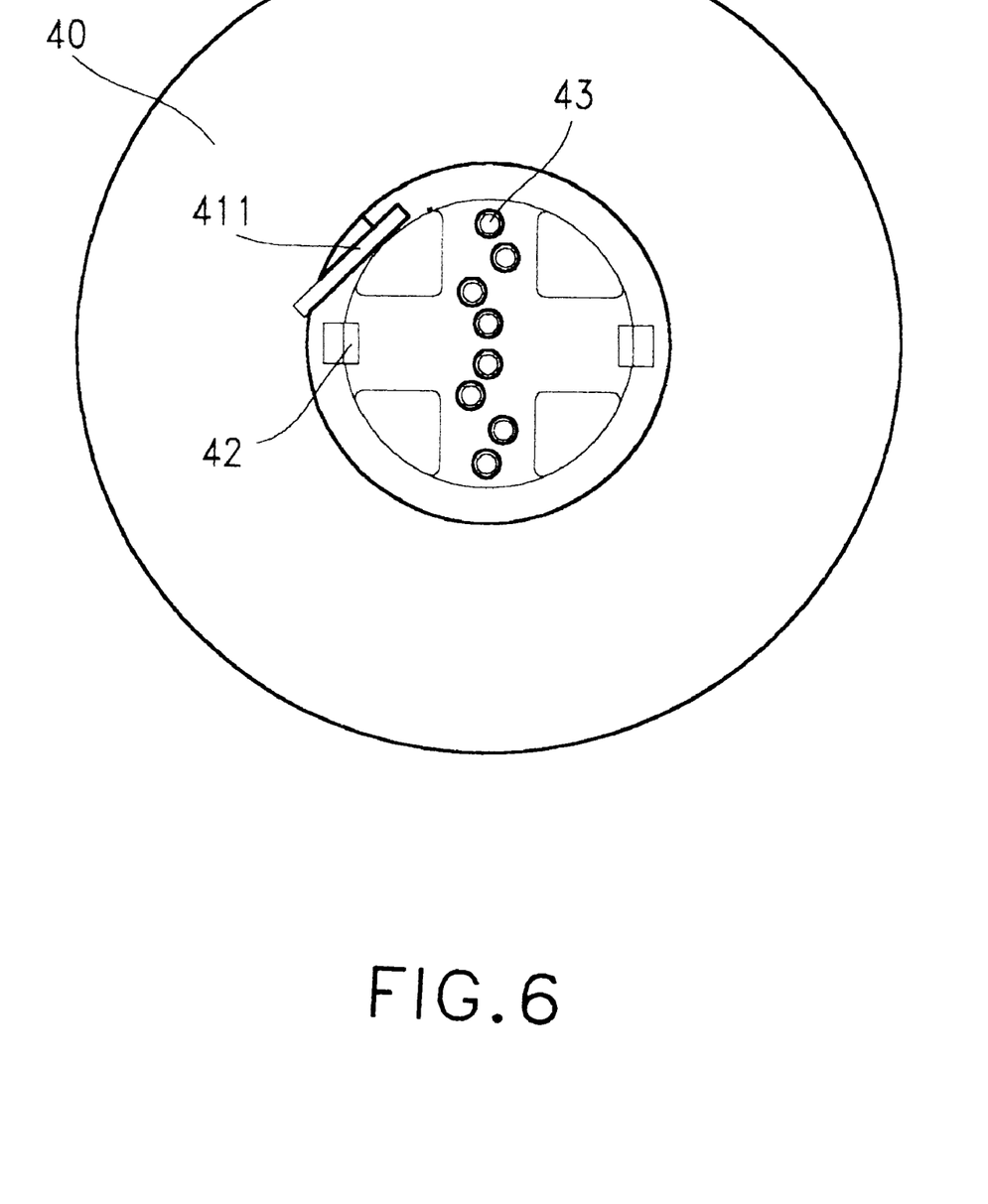
FIG. 6 is a bottom view of the rotary disk for the electric wire reel according to the present invention.
Figure 7:
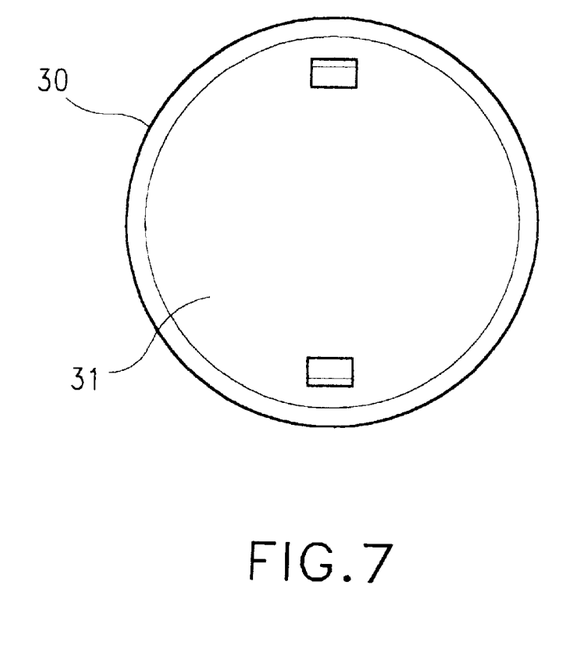
FIG. 7 is a top plain view of the rotary mount for the electric wire reel according to the present invention.
Figure 8:
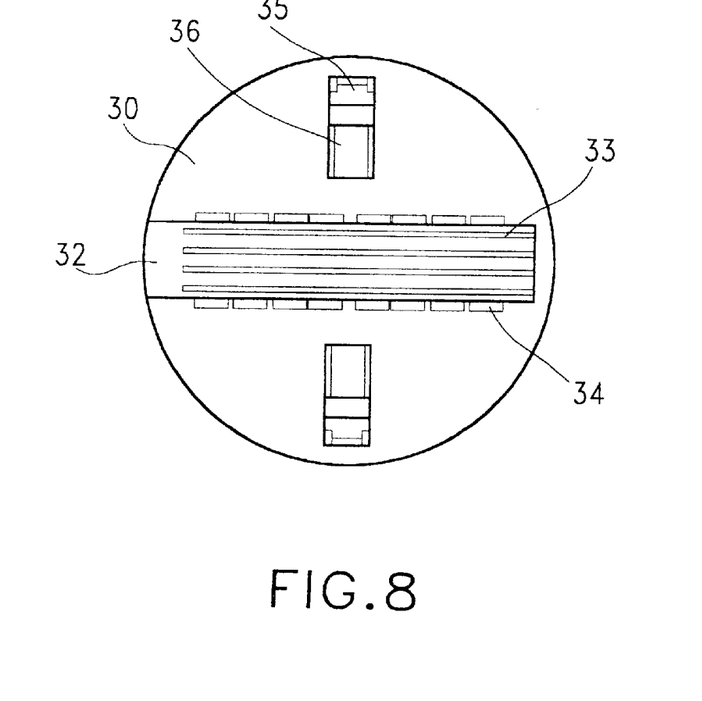
FIG. 8 is a bottom view of the rotary mount for the electric wire reel according to the present invention.
Figure 9:
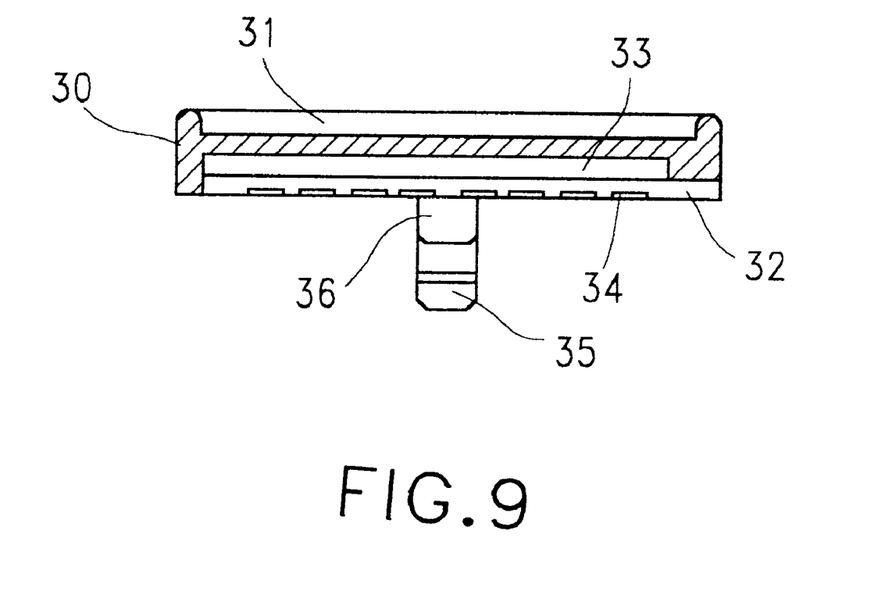
FIG. 9 is a sectional side view of the rotary mount for the electric wire reel according to the present invention.
Figure 10:
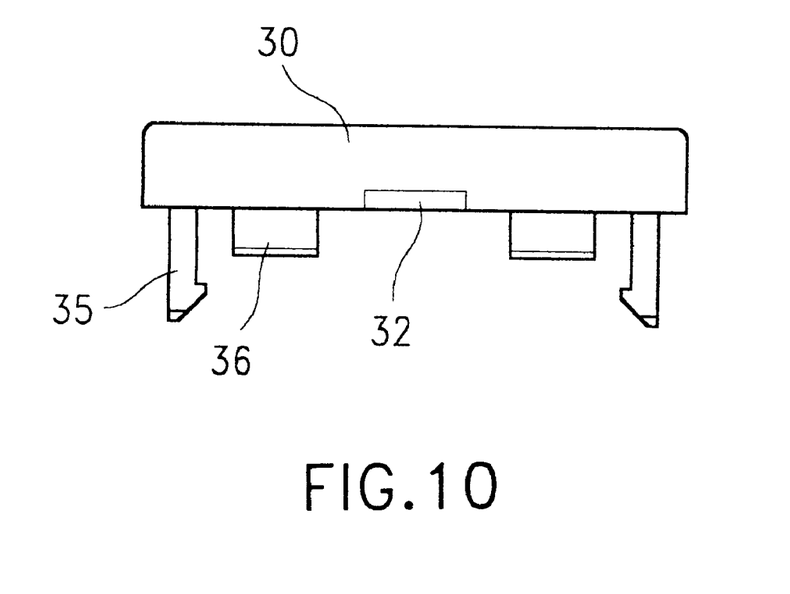
FIG. 10 is another side view of the rotary mount for the electric wire reel according to the present invention.
Figure 11:
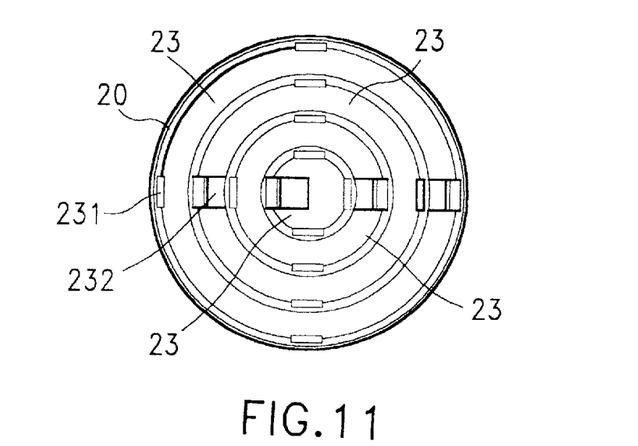
FIG. 11 is a top view of the terminal holder for the electric wire reel according to the present invention.
Figure 12:
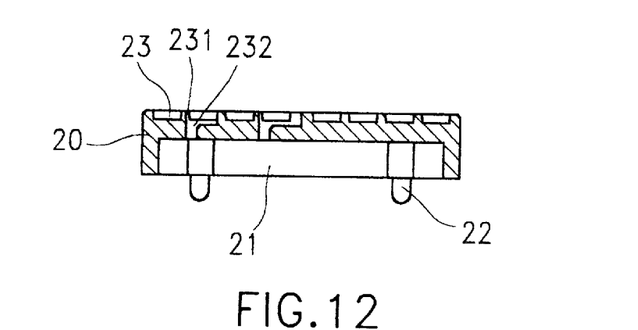
FIG. 12 is a sectional side view of the terminal holder for the electric wire reel according to the present invention.
Figure 13:
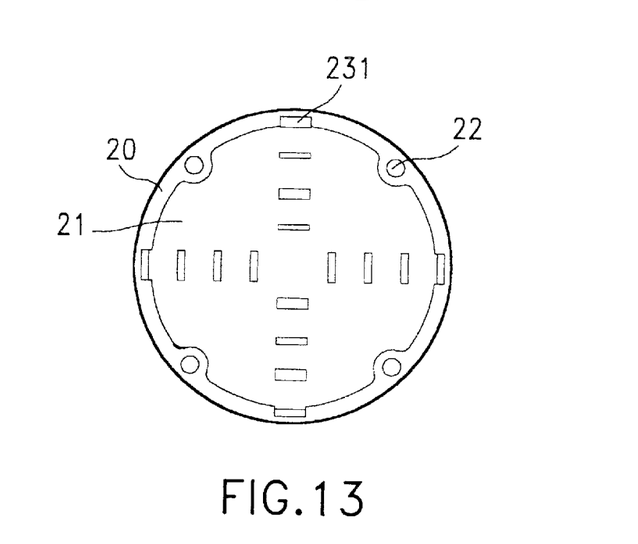
FIG. 13 is a bottom view of the terminal holder for the electric wire reel according to the present invention.
Figure 14:
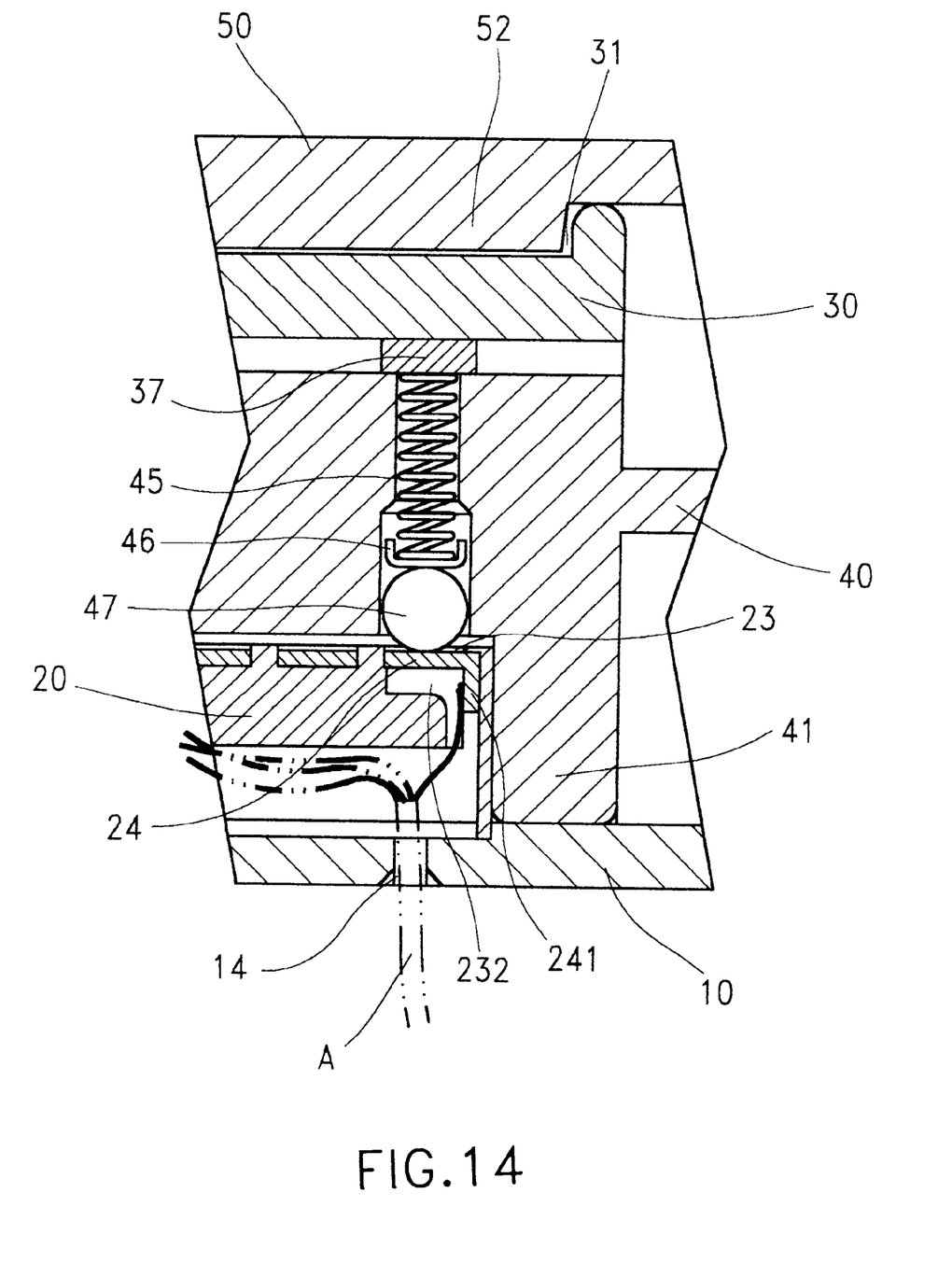
FIG. 14 is a sectional view in an enlarged scale of a part of the present invention.
Figure 15:
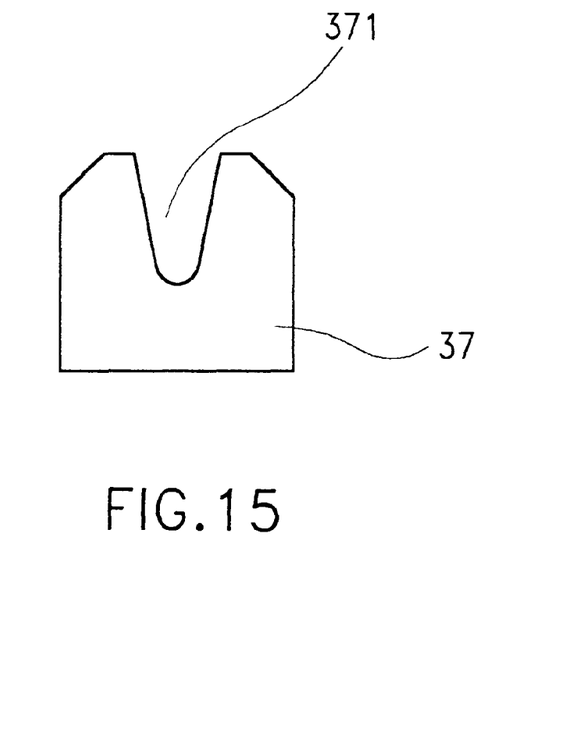
FIG. 15 is a front view of a L-shaped terminal according to the present invention.
Figure 16:
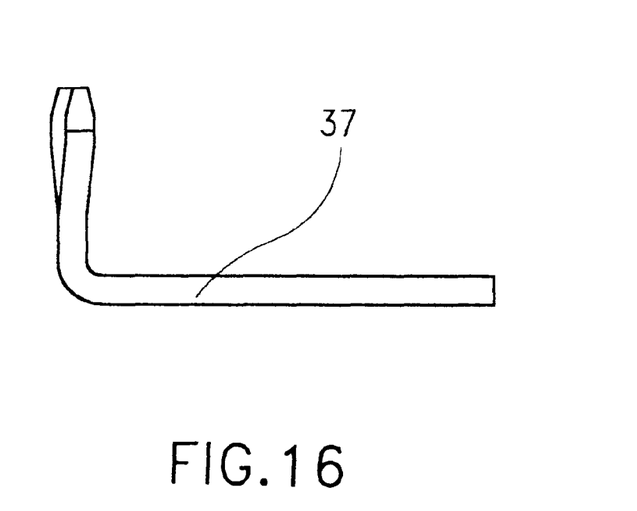
FIG. 16 is a side view of the L-shaped terminal shown in FIG. 15.
Figure 17:
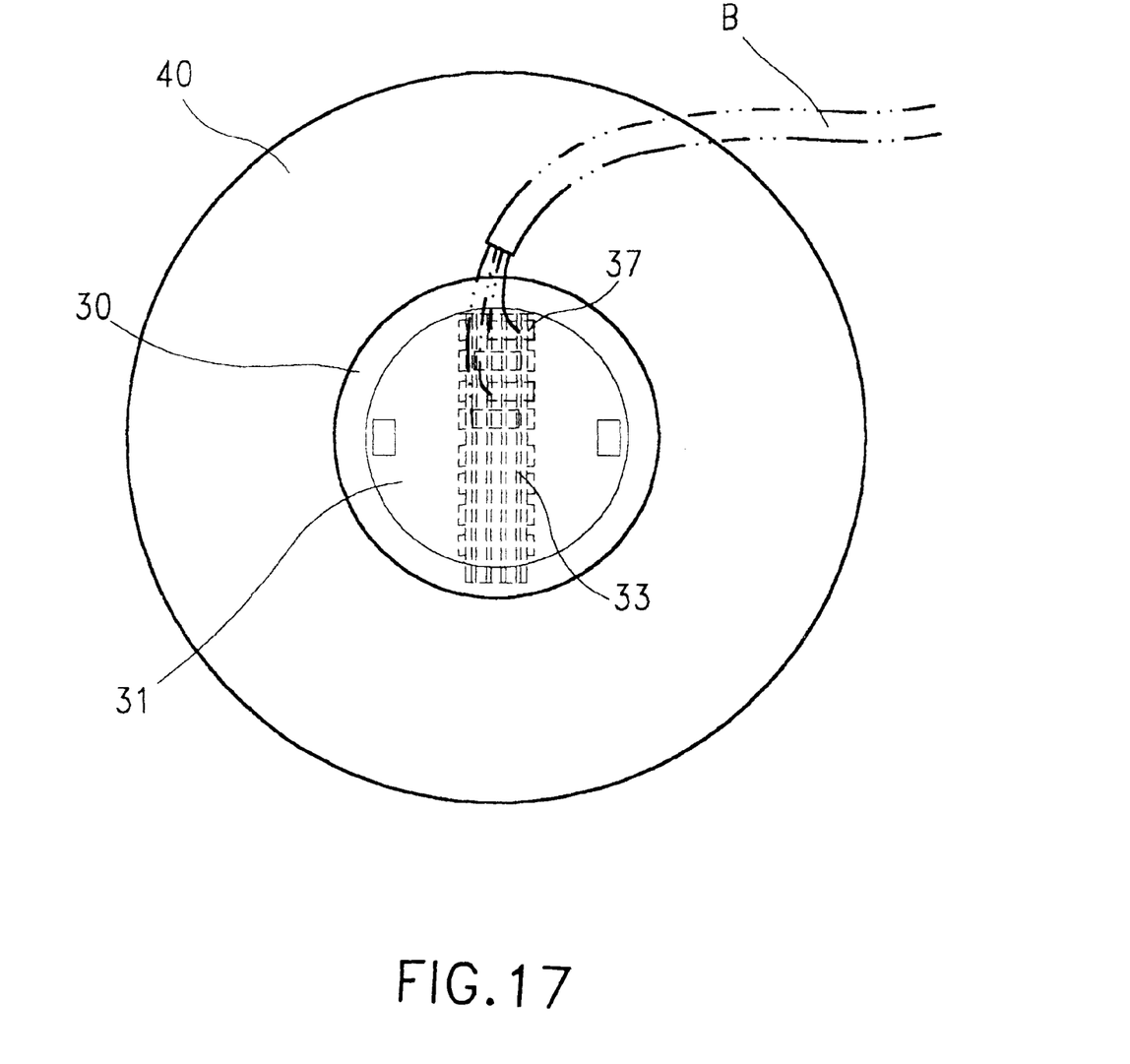
FIG. 17 is a schematic drawing showing the connection between the conductors of the electric wire B and the L-shaped terminals in the rotary mount.

Referring to FIG. 3 and FIGS. 1 and 2 again, the top cover shell 50 is covered on the bottom cover shell 10, having an annular coupling flange 52 raised from the bottom side wall thereof at the center, a plurality of downward plug rods 54 raised from the bottom side wall and respectively plugged into the mounting holes 18 on the bottom cover shell 10, and a side wire notch 56 through which an electric wire B passes.

Referring to FIGS. from 4 through 6 and FIGS. 1 and 2 again, the rotary disk 40 is mounted within the top cover shell 50 and the bottom cover shell 10, comprising a hub 41, a retaining notch 411 at the peripheral of the hub 41 to which an outer end of the spiral power spring 60 is connected, a plurality of rectangular locating holes 42 and a plurality of vertical through holes 43 at the center area within the hub 41, a plurality of metal compression springs 45 respectively mounted in the vertical through holes 43 at the top side, a plurality of metal balls 47 respectively mounted in the vertical through holes 43 at the bottom side, and a plurality of metal washers 46 respectively mounted in the vertical through holes 43 between the respective metal compression springs 45 and the respective metal balls 47.

Referring to FIGS. from 7 through 10 and FIGS. 1 and 2 again, the rotary mount 30 is mounted between the rotary disk 40 and the top cover shell 50, comprising a circular top coupling recess 31 at the top side thereof which receives the annular coupling flange 52 of the top cover shell 50, a rectangular bottom recess 32 at the bottom side thereof, parallel grooves 33 disposed in the rectangular bottom recess 32 in parallel to the two opposite long sides of the rectangular bottom recess 32, a plurality of downward hooks 35 and downward locating blocks 36 fastened to the rectangular locating holes 42 on the rotary disk 40, enabling the rotary mount 30 to be rotated with the rotary disk 40 on the annular coupling flange 52 of the top cover shell 50, and two rows of recessed holes 34 arranged along the two opposite long sides of the rectangular bottom recess 32.

Referring to FIGS. from 11 through 13 and FIGS. 1 and 2 again, the terminal holder 20 is mounted within the hub 41 of the rotary disk 40 and the circular recess 11 of the bottom cover shell 10, comprising a bottom open chamber 21 at the bottom side thereof, a plurality of downward mounting rods 22 respectively fastened to the locating holes 12 in the circular recess 11 of the bottom cover shell 10, a plurality of annular grooves 23 concentrically disposed at the top side thereof, a plurality of locating notches 231 respectively equiangularly spaced in the annular grooves 23, and a plurality of wire holes 232 respectively provided in the annular grooves 23 through the top and bottom sides. A plurality of annular terminals 24 of different diameters are respectively mounted in the annular grooves 23, each having a plurality of positioning legs 241 respectively fastened to the locating notches 231. An electric wire A is inserted through the wire outlet 14 on the bottom cover shell 10, having a plurality of conductors respectively inserted through the wire holes 232 and welded to the positioning legs 241 of the annular terminals 24.

Referring to FIGS. from 14 through 17 and FIGS. 1 and 2 again, a plurality of L-shaped terminals 37 are respectively fixedly mounted in the grooves 33 in the rectangular bottom recess 32 of the rotary mount 30 corresponding to the vertical through holes 43 on the rotary disk 40. Each L-shaped terminal 37 has a short side and a long side connected at right angles, and a V-notch 371 at the end of the short side. The electric wire B which is inserted through the side wire notch 56 of the top cover shell 50 is wound round the rotary mount 30, having a plurality of conductors respectively fastened to the V-notches 371 of the L-shaped terminals 37. The short side of each L-shaped terminal 37 is fastened to one groove 33 in the rectangular bottom recess 32 of the rotary mount 30, and the long side of each L-shaped terminal 37 is positioned in one recessed hole 34. When installed, the L-shaped terminals 37 are respectively maintained in contact with the metal compression springs 45. Therefore, the two electric wires A,B are electrically connected through the terminals 24,37, the metal balls 47, the metal washers 46 and the metal compression springs 45. When the electric wire B is pulled outwards from the electric wire reel to the desired distance, the rotary mount 30 and the rotary disk 40 are rotated on the terminal holder 20, causing the spiral power spring 60 to be rolled up. When the electric wire B is released, the spiral power spring 60 immediately returns to its former shape, causing the rotary disk 40 and the rotary mount 30 to be rotated in the reversed direction, and therefore the electric wire B is taken up by the rotary mount 30.

While only one embodiment of the present invention has been shown and described, it will be understood that various modifications and changes could be made thereunto without departing from the spirit and scope of the invention disclosed.

What the invention claimed is:

1. An electric wire reel comprising:

a bottom cover shell comprising a circular center recess, a wire outlet which allows a first electric wire inserted through, a spring chamber at one side of said circular center recess, and a spiral power spring mounted in said spring chamber;

a top cover shell covered on said bottom cover shell, said top cover shell comprising an annular coupling flange raised from a bottom side wall thereof at the center of the top cover shell, and a side wire notch;

a rotary disk mounted within said top cover shell and said bottom cover shell, said rotary disk comprising a hub, a retaining notch at the peripheral of said hub to which an outer end of said spiral power spring be fastened, a plurality of vertical through holes at a center area within said hub and a plurality of metal balls respectively mounted in said vertical through holes at a bottom side;

a rotary mount mounted between said rotary disk and said top cover shell, said rotary mount comprising a circular top coupling recess at a top side wall thereof which receives the annular coupling flange of said top cover shell, a rectangular bottom recess at a bottom side wall thereof, parallel grooves disposed in said rectangular bottom recess in parallel to two opposite long sides of said rectangular bottom recess, a plurality of L-shaped terminals respectively mounted in said grooves and disposed in contact with said metal balls, said rotary mount fastened to said rotary disk and rotated with said rotary disk;

a terminal holder mounted within the hub of said rotary disk, said terminal holder comprising a bottom open chamber at a bottom side wall thereof, which fastened to the circular recess of said bottom cover shell, a plurality of annular grooves concentrically disposed at a top side wall of said terminal holder, a plurality of locating notches respectively equiangularly spaced in said annular grooves, a plurality of wire holes respectively provided in said annular grooves, a plurality of annular terminals of different diameters respectively mounted in said annular grooves and disposed in contact with said metal balls, said annular terminals each having a plurality of positioning legs respectively fastened to the locating notches in the annular grooves of said terminal holder and be welded to a plurality of conductors of said first electric wire after said first electric wire inserted through the wire holes of said terminal holder; and a second electric wire wound round said rotary mount and extended out of the side wire notch of said top cover shell, said second electric wire having a plurality of conductors respectively fastened to said L-shaped terminals.

2. The electric wire reel of claim 1 wherein said L-shaped terminals each have a short side fastened to one groove in the rectangular bottom recess of said rotary mount, and a long side transversely mounted in the rectangular bottom recess of said rotary mount, the short side of each of said L-shaped terminals having a V-shaped end notch to which one conductor of said second electric wire is connected.

3. The electric wire reel of claim 1 wherein said rotary disk further comprises a plurality of metal compression springs respectively mounted between the vertical through holes at a top side of said rotary disk and said metal balls, a plurality of metal washers respectively mounted in the vertical through holes of said rotary disk and disposed in contact between said metal compression springs and said metal balls.

* * * * *